(No Model.)
C. B. DICKENS.
NAILLESS HORSESHOE.
No. 496,351. Patented Apr. 25, 1893.
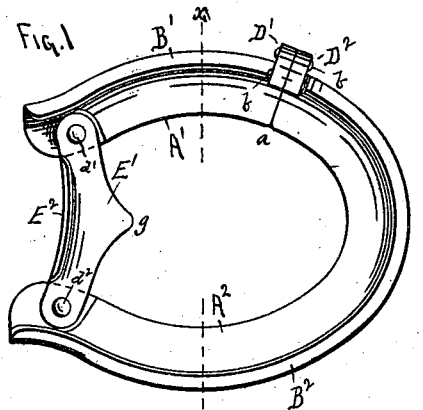
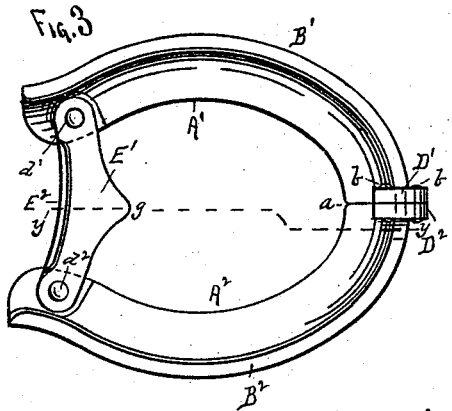
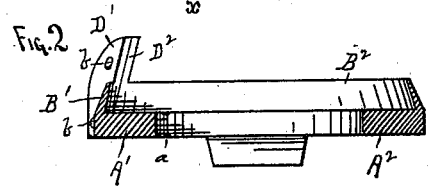
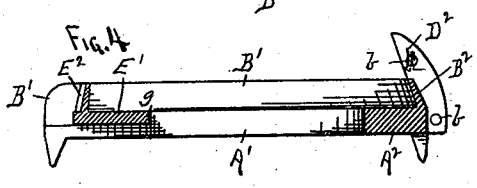
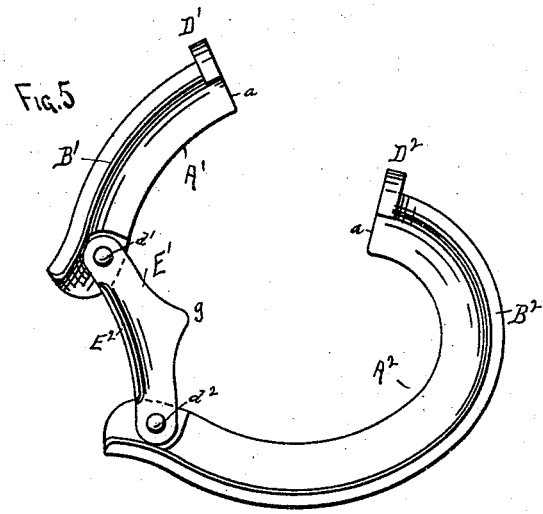
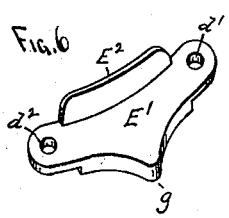
WITNESSES.
H. T. Webster
H. N. Gardiner
Chester B. Dickens,
INVENTOR. By
Charles N. Woodward
Atty.

UNITED STATES PATENT OFFICE.

CHESTER B. DICKENS, OF MINNEAPOLIS, MINNESOTA.

NAILLESS HORSESHOE.

SPECIFICATION forming part of Letters Patent No. 496,351, dated April 25, 1893.

Application filed December 13, 1892. Serial No. 455,024. (No model.)

*To all whom it may concern:*

Be it known that I, CHESTER B. DICKENS, a citizen of the United States, residing at Minneapolis, in the county of Hennepin and State of Minnesota, have invented certain new and useful Improvements in Nailless Horseshoes, of which the following is a specification.

This invention relates to that class of horseshoes which are adapted to be secured to the feet of the horse without the use of nails driven into the hoofs, and consists in the construction and arrangement of parts as hereinafter shown and described and specifically pointed out in the claim.

In the drawings,—Figure 1 is a plan view. Fig. 2 is a cross section on the line $x$—$x$ of Fig. 1. Fig. 3 is a plan view showing a slight modification in the construction. Fig. 4 is a longitudinal sectional view on the line $y$—$y$ of Fig. 3. Fig. 5 is a plan view showing the parts distended to enable the shoe to be attached to the hoof. Fig. 6 is a perspective view of the heel bar, detached.

The body of the shoe is formed in two or more parts $A'$ $A^2$ which when placed in end contact form the complete outline of the shoe, as shown in Figs. 1 and 3. In Fig. 1 the joint $a$ is shown at one side, while in Fig. 3 the joint is shown at the front, but the location of the joint is immaterial, and may be placed at any desired point. Projecting upward from the outer rim of the parts $A'$ $A^2$ are thin flanges $B'$ $B^2$ which are bent inward to conform to the hoof, and when the shoe is in position serve to retain it in place thereon.

At the outer ends of the joints $a$ the parts $A'$ $A^2$ are formed with lugs $D'$ $D^2$ which curve inward to conform to the shape of the hoof and are secured together at one or more points by screws or rivets $b$ by which means the parts $A'$ $B'$ and $A^2$ $B^2$ are connected together, as shown.

$E'$ is a bar pivoted by its ends at $d'$ $d^2$ to the "heel" ends of the shoe, or parts $A'$ $A^2$, and provided with an inwardly projecting portion $g$ to form a slight support and protection to the "frog" of the hoof, and also provided with an upwardly projecting flange $E^2$ which protects the "heel" of the hoof from bruises or abrasions.

When the shoes are to be applied the parts $A'$ $B'$ and $A^2$ $B^2$ are spread apart, as in Fig. 5, and then clasped around the hoof and the parts secured in place by the screws or rivets $b$, the flanges $B'$ $B^2$ fitting the lower edges of the hoof tightly and effectually preventing the detachment of the shoe unless the rivets or screws are first removed. By this simple means no nails, screws, or other parts are protruded into the hoof, and no part of the hoof is unduly clamped or bound by the pressure of the shoe.

The parts $A'$ $B'$, $A^2$ $B^2$, and $E'$ $E^2$, will each be preferably of malleable iron or soft steel, so that they can be readily bent to conform to slight variations in the sizes of the hoofs, and also to adapt them to any irregularities in the forms of the hoofs.

If the flanges $B'$ $B^2$ do not fit the hoof snugly, they can be readily bent until they are of the proper shape. By this arrangement and manner of forming the shoe the formation of quarter cracks, split hoofs, corns, gravel hoofs, prick soles, and similar injuries is entirely prevented, while by employing the cross bar $E'$ with its protecting flange $E^2$, all bruising or abrading of the "heel" or "frog" portion of the foot is prevented.

The shoes will be made in as many sizes and shapes as may be required, as in the manufacture of ordinary horseshoes.

The clamp $D'$ $D^2$ may be utilized also to secure a toe-weight to the shoe when required, thereby avoiding the necessity for additional attachments for that purpose.

Having thus described my invention, what I claim as new is—

A nailless horseshoe consisting of two or more parts $A'$ $A^2$ having flanges $B'$ $B^2$ united by lugs $D'$ $D^2$, in combination with a heel bar $E'$ pivoted to the rear ends of the shoe and having a heel protecting flange $E^2$, substantially as hereinbefore set forth.

In testimony whereof I have hereunto set my hand in the presence of two subscribing witnesses.

CHESTER B. DICKENS.

Witnesses:
C. N. WOODWARD,
H. S. WEBSTER.